United States Patent [19]

Lake

[11] 3,931,258

[45] Jan. 6, 1976

[54] RECOVERY OF SUGAR CANE WAX

[75] Inventor: Alan W. Lake, Transvaal, South Africa

[73] Assignee: Chemical Services (Proprietary) Limited, Johannesburg, South Africa

[22] Filed: Dec. 4, 1974

[21] Appl. No.: 529,587

[30] Foreign Application Priority Data

Dec. 13, 1973  South Africa.................... 73/9454

[52] U.S. Cl. .......... 260/412.5; 260/412; 260/236.5
[51] Int. Cl.$^2$..................... C11B 13/00; C11B 1/10
[58] Field of Search.............. 260/236.5, 412, 412.5

[56] References Cited
UNITED STATES PATENTS

| | | | |
|---|---|---|---|
| 2,428,813 | 10/1947 | Rhodes et al..................... | 260/412.5 |
| 2,476,974 | 7/1949 | Goepfert........................... | 260/412.5 |
| 2,499,008 | 2/1950 | Swenson........................... | 260/412.5 |
| 2,508,002 | 5/1950 | Swenson........................... | 260/412.5 |

OTHER PUBLICATIONS

Balch, "Wax & Fatty Byproducts From Sugarcane,"- Tech. Report Series No. 3, (Oct. 1947), Sugar Research Foundation, Inc., N.Y.

Chemical Abstracts, Vol. 22: P1493$^4$(1923); Vol. 10: 977$^9$ (1916); Vol. 37: 5268$^7$ (1943) & Vol. 43: 7730$_g$ (1949).

Primary Examiner—Donald B. Moyer
Attorney, Agent, or Firm—Young & Thompson

[57] ABSTRACT

This invention relates to a process for recovering wax from filter cake derived from the treatment of sugar cane in the production of cane sugar. The process involves taking up the wax in water by forming an aqueous slurry of the filter cake, adding a surface active agent to the slurry to assist the release of wax from the fibres in the slurry and then heating the slurry to melt the wax which then passes into the water. Thereafter an extractant for the wax, such as kerosene, is added to the slurry to extract the wax whereafter the extractant is separated off, the wax is allowed to crystallize on cooling and is then recovered by filtration or centrifuging.

10 Claims, No Drawings

RECOVERY OF SUGAR CANE WAX

This invention relates to the extraction of sugar cane wax.

Sugar cane wax comprises a mixture of long chain fatty acids, alcohols, esters, aldehydes and ketones together with a range of hydrocarbon and resin components. Sugar cane wax is normally considered as containing a "wax" fraction, an "oil" fraction and a "resin" fraction, the former comprising the carboxylated components of the mix and the latter two the hydrocarbon components thereof.

The overall crude wax has several industrial uses which include the coating of steel products for metal working and rust prevention while for uses such as polish production refinement of the crude wax into its fractions is necessary.

The existing method of crude sugar cane wax extraction involves a solvent extraction on the filter cake derived from cane sugar production. In the processing of sugar cane a filter cake is derived comprising, on a dry basis, approximately 10 percent sugar cane wax (of which 45 percent is the wax fraction), 20 percent carbohydrate, 10 percent protein and 40 percent fibres, the balance being inorganic components and other impurities. The solvent extraction technique involves dissolving the crude wax off from the cake and then evaporating off the solvent. It is expensive in terms of energy requirements and solvent losses, presents a serious fire hazard and consequently involves the use of extensive plant.

It is an object of the invention to provide an alternative and less costly method of extraction of the crude wax fraction of sugar cane wax directly from the moist filter press cake obtained in cane sugar production.

According to the invention a method of recovering sugar cane wax from filter cake derived from the treatment of sugar cane includes the steps of forming an aqueous slurry of the filter cake, including a surface active agent in the slurry to weaken the bond between wax and fibres in the slurry, if the slurry is alkaline adjusting the pH of the slurry to the acid side, heating the slurry to melt the wax, adding an extractant vehicle for the wax to the slurry to extract the wax from the aqueous phase, and separating the extractant vehicle containing the wax from the aqueous slurry.

In the preferred method of the invention the surface active agent operative to release wax from the fibre carrier or at least to weaken the bond between these materials is a surfactant selected from the class comprising quaternary ammonium compounds. It is also possible to employ surface active agents other than quaternary ammonium compounds to assist release of the wax from the fibres of the filter cake.

For example sodium sulphosuccinate may be used, but with less efficiency. The preferred surface active agent is myristyl dimethyl benzene ammonium chloride. Such surface active agent should have a cloud point above the temperature to which the slurry is heated in order to melt the wax. Normally the wax will melt between 85° and 90°C and the slurry will be heated to at least this temperature.

Acidification of the slurry, if alkaline, may be conducted with a mineral acid, preferably hydrochloric acid, in order to render the pH of the system less than 7.0.

The pH of the slurry may generally be lowered to between 3.5 and 6.5 and preferably to between 4 and 5 by the addition of the acid since at this acidity the best separation of wax from the fibres is obtained. Other acids may be used to reduce the pH of the slurry including organic acids such as acetic, citric and tartaric acids but hydrochloric acid causes least problem from an effluent point of view and is also less costly than other acids.

When the pH of the slurry has been adjusted to between 4 and 5 the slurry may be heated to boiling point to melt the wax which is then released from the fibres of the slurry. However, separation of the wax from the aqueous phase of the slurry directly without the use of an extractant is difficult since the specific gravity of the wax is close to that of the slurry.

For this reason an extractant vehicle is added to the slurry, after heating thereof, to allow the extractant vehicle to extract the wax from the aqueous slurry. The extractant vehicle is an oil or solvent, preferably a solvent. Such extractant vehicle which now includes the molten wax is allowed to separate from the aqueous phase on standing whereafter the upper extractant phase is decanted off and the wax is thereafter recovered from the extractant vehicle. Alternatively with a suitable extractant vehicle the combination may be used as such in certain commercial operations. For example, if spindle oil is used as the extractant vehicle the combination would be a useful metal working lubricant. Further alternatively the extractant vehicle may be evaporated to yield the wax fraction which may contain some oil and resin fractions.

Also according to the invention the wax is separated from the extractant vehicle by allowing this to cool so that wax crystals separate out. The wax crystals may then be separated by filtration or by means of a centrifuge.

It will be appreciated that by merely blending the extractant vehicle with the slurry which has been heated to 90°C or more, the temperature of the extractant would be raised. The heated aqueous slurry and extractant phase are then gently blended by agitation and boiling so that the molten wax is brought into contact with extractant vehicle without causing the extractant vehicle to become intimately mixed with the slurry. In this way a major proportion of the cane wax is rapidly taken up in the extractant vehicle.

Such extractant should be carefully selected to provide for good affinity for the wax at the raised temperature. Further if separation of the wax is desired when the extractant vehicle should also be selected to have poor affinity for the wax on cooling so that easy and substantial separation by crystallization of the cane wax on cooling is obtained. Also the extractant vehicle should be such that residual amounts thereof in the separated wax can be tolerated in the industrial uses to which the wax may be put. It has been found that odourless kerosene such as that supplied by the Shell Chemical Company is excellent as an extractant vehicle while solvents of higher volatility do not allow separation of the wax on cooling and solvents and oils of higher viscosity tend to separate wax slowly and retard filtration of the wax crystals. More volatile solvents present a fire hazard and also tend to be objectionable even in residual amounts in the final wax products. High boiling point alcohols have been found to be admirably suited for the extraction of the wax fraction of sugar cane wax and the subsequent crystallization of the wax on cooling. Such alcohols are, however, relatively costly and for all practical purposes kerosene is the most suitable extractant vehicle yet found.

In the operation of the method of the invention the filter cake may be mixed with 1 to 5 times its volume of water and 0.05 to 0.5 percent of the surface active agent while about 10 to 30 percent of the total volume of extractant vehicle is added to the hot slurry for extraction of the wax.

Once the extractant vehicle has been added to the slurry and the mass gently agitated to combine the molten wax with the extractant vehicle, a period of 30 to 60 minutes should be allowed to achieve a maximum separation of the aqueous and extractant phases. After separation of the extractant phase slow cooling to 20° to 30°C should be adopted to permit efficient crystallization of the cooled wax.

It has been found that maximum yield of cane wax is obtained from fresh filter press cake. If the filter cake is allowed to age the wax appears to become so tightly bound to the fibres that inefficient release according to the method of the invention is obtained. The filter cake used in the process should accordingly be no more than 2 weeks old.

After removal of the cane wax from the extractant vehicle the latter, containing a proportion of the oil and resin fractions of the sugar cane wax as well as a low concentration of the wax fraction of the sugar cane wax, can be returned for a further extraction cycle on fresh slurry. After many extraction cycles the extractant becomes contaminated to too great an extent with sugar cane oil and resin and can no longer be used in the extraction. The aqueous slurry after removal of the extractant vehicle and wax therefrom may be filtered to remove solids and the filtrate employed to form a further slurry with fresh filter cake by suitable addition of surface active agent and make-up acid if necessary.

Sugar cane wax derived in accordance with the method described above may contain up to 10 percent of the extractant vehicle but for many industrial uses such as metal working, rust prevention, mould release agents and lubricant manufacture some extractant can be tolerated in the wax. In this state the wax is recovered far more economically than by previous processes. If desired the wax can be treated for extraction of the traces of extractant by vacuum distillation or recrystallization from acetone. Acetone extraction yields pure cane wax which may be bleached to suit the polish market requirements. The main purpose of this invention, however, is to provide crude wax at an economic price, which can then be further processed to suit market needs. It will be appreciated that the process of the invention may be operated batch-wise or on a continuous basis.

EXAMPLE I

A filter cake obtained in the production of sugar from sugar cane was analysed on a wet basis and found to have 3.0 to 3.5 percent of wax.

1000 kg. of the fresh filter cake, 2000 kg. of water and 8 kg. of myristyl dimethyl benzene ammonium chloride were mixed to form a slurry having a pH of 6.5 in a 4000 liter steel vessel equipped with a slow speed paddle stirrer. The vessel was also equipped with a steamjacket and the slurry was heated to boiling point.

500 kg. of odourless kerosene was then piped onto the surface of the slurry and the mix was kept at boiling point (± 95°C) with gentle stirring for 1.0 – 1.5 hours.

The solvent extractant vehicle was then removed from the mix by pumping water into the base of vessel to raise mass of solvent which was bled off via an overflow pipe. The mass of solvent containing the wax was then pumped to a settling vessel and cooled by means of cooling coils to ambient temperature.

The wax fraction crystallised and the mass was then passed through a plate filter and the wax residue recovered. This wax was vacuum dried to remove residual solvent and the clean crude wax product weighed. 18 kg. of wax was obtained.

EXAMPLE II

A slurry was formed in the same way as that prepared in accordance with Example I using the same quantities of fresh filter cake, water, quaternary ammonium compound and odourless kerosene. In this case, however, 40 kg. of hydrochloric acid was added to the slurry prior to pumping the solvent extractant onto the surface thereof and the acid reduced the pH of the slurry to 3.5.

The sugar cane wax was then recovered from the solvent extractant vehicle in the same way as that described in Example I and upon weighing it was found that 19 kg. of wax was derived.

It is thus apparent that reduction of the pH of the slurry from 6.5 to 3.5 provided a somewhat better release of wax from the fibres of the filter cake since approximately 5.5 percent more of the wax was obtained from the acidified slurry.

The essence of the invention, however, resides in the extraction of the wax from the filter cake in aqueous slurry form and the invention includes within its scope not only the process as outlined but also the sugar cane wax when recovered by the method of the invention.

I claim:

1. A method of recovering sugar cane wax from filter cake derived from the treatment of sugar cane including the steps of forming an aqueous slurry of the filter cake, the slurry containing a quaternary ammonium compound as a cationic surface active agent to weaken the bond between wax and fibers in the slurry, if the slurry is alkaline adjusting the pH of the slurry to the acid side, heating the slurry to melt the wax, adding an extractant vehicle which is a solvent for the wax to the slurry to extract the wax from the aqueous phase, and separating the extractant vehicle containing the wax from the liquid phase of the slurry.

2. The method of claim 1 in which the surface active wetting agent is myristyl dimethyl benzene ammonium chloride.

3. The method of claim 1 which the pH of the slurry is adjusted to between 4 and 5.

4. The method of claim 3 in which the pH of the slurry is adjusted by the addition of hydrochloric acid thereto.

5. The method of claim 1 in which the slurry and extractant vehicle are gently agitated by boiling the slurry, the mass thereafter being allowed to stand to permit the extractant and aqueous phases to separate whereafter the extractant is decanted off.

6. The method of claim 1 in which the wax is recovered from the extractant vehicle by cooling the extractant, allowing the wax to crystallise and separating the wax from the extractant by filtration or by centrifuging.

7. The method of claim 1 in which the extractant is added to the slurry only after the latter has been heated to melt the wax.

8. The method of claim 6 in which the extractant vehicle is kerosene.

9. The method of claim 1 in which the slurry is formed by mixing the filter cake with 1 to 5 times its volume of water whereafter between 0.05 and 0.5 percent by volume of surface active agent is added thereto and 10 to 30 percent of extractant vehicle.

10. The method of claim 1, the extractant vehicle being kerosene, the slurry being formed by mixing the filter cake with 1 to 5 times its volume of water whereafter between 0.05 and 0.5 percent by volume of the surface active agent is added thereto and 10 to 30 percent of extractant vehicle, the slurry and the extractant vehicle being gently agitated by boiling the slurry, the mass thereafter being allowed to stand to permit the extractant and aqueous phases to separate whereafter the extractant is decanted off, the wax is recovered from the extractant vehicle by cooling the extractant, allowing the wax to crystallize and thereafter separating the wax from the extractant.

* * * * *